US010959147B2

(12) United States Patent
Wang

(10) Patent No.: US 10,959,147 B2
(45) Date of Patent: Mar. 23, 2021

(54) ACCELERATED RETURN TO 5G AFTER LTE FALL BACK

(71) Applicant: T-Mobile USA, Inc., Bellevue, WA (US)

(72) Inventor: Jun Wang, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/457,751

(22) Filed: Jun. 28, 2019

(65) Prior Publication Data
US 2020/0413314 A1 Dec. 31, 2020

(51) Int. Cl.
H04W 36/14 (2009.01)
H04W 84/04 (2009.01)

(52) U.S. Cl.
CPC .......... *H04W 36/14* (2013.01); *H04W 84/042* (2013.01)

(58) Field of Classification Search
CPC .................................................. H04W 36/14
See application file for complete search history.

(56) References Cited

U.S. PATENT DOCUMENTS

| 10,542,475 | B1* | 1/2020 | Singh | H04W 36/38 |
| 2011/0312329 | A1* | 12/2011 | Wang | H04W 88/08 |
| | | | | 455/450 |
| 2017/0295521 | A1* | 10/2017 | Duan | H04W 36/0022 |
| 2020/0015128 | A1* | 1/2020 | Stojanovski | H04W 8/08 |

OTHER PUBLICATIONS

Ericsson AB. 5G voice—network evolution aspects. Voice services in a 5G System with 3GPP option 2 deployment. 2018 [online], [retrieved on Jun. 28, 2019]. Retrieved from the Internet, <URL: https://foryou.ericsson.com/1809-BDGS-WCTGEN-VoLTE5GVoicepaper2.html?_ga=2.174326624.312958517.1561765730-629046050.1561765730>.

* cited by examiner

*Primary Examiner* — Kevin M Cunningham
(74) *Attorney, Agent, or Firm* — Han Santos, PLLC

(57) ABSTRACT

An LTE base station may receive a release command for a voice bearer carrying an IMS voice communication of a user device. The release command may be provided by a core network following a termination of the IMS voice communication. The LTE base station may initiate timer for a predetermined time period following in response to the voice bearer release command. When the LTE base station is carrying an active data bearer for data traffic of the user device at an end of the predetermined time period, the LTE base station may direct the user device to switch from the LTE base station to a 5G base station of the wireless carrier network. When the LTE base station is not carrying any active data bearer for the data traffic at the end of the predetermined time period, the LTE base station may place the user device into an idle state.

20 Claims, 5 Drawing Sheets

ACCELERATED RETURN TO 5G AFTER LTE FALL BACK

BACKGROUND

With the advent of the 5G wireless telecommunication system, a new world of faster and higher capacity communication is promised to the consumer. As a wireless telecommunication carrier deploys the 5G wireless telecommunication equipment to its network nodes to take advantage of the benefits that this system has to offer, the overall coverage of the network may not be contiguous. As the deployment of the 5G system is currently in its infancy, there may be holes in the overall coverage, or certain areas in a city or neighborhood will temporarily not enjoy the benefits that 5G has to offer. Additionally, as a 5G enabled user device is moving from an area with 5G coverage to an area where there is no 5G coverage, contiguity in the communication session may be an issue. In cases such as these, it may be advantageous for the user device to fall back to using the LTE system of the network. This is because the LTE system is a well-established system with much higher coverage penetration, for which contiguity in the communication session is much less of a challenge.

Examples of communications that may benefit from using the LTE system are IP Multimedia Subsystem (IMS) voice communications. Such communications generally do not require extensive data bandwidth and they can be much better serviced by the LTE system. Once the core network detects an incoming IMS voice communication session from a user device, a wireless telecommunication carrier may choose to transfer the IMS communication session from the 5G system to the LTE system for a better user experience. However, in some instances, after the IMS voice session in LTE is completed, the user device may remain trapped in the LTE network due to user device active data bearers. In these cases, the user device may not transfer back to the 5G system, which will reduce the overall performance of the user device and prevents the user from taking advantage of the 5G network benefits.

BRIEF DESCRIPTION OF THE DRAWINGS

The detailed description is depicted with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
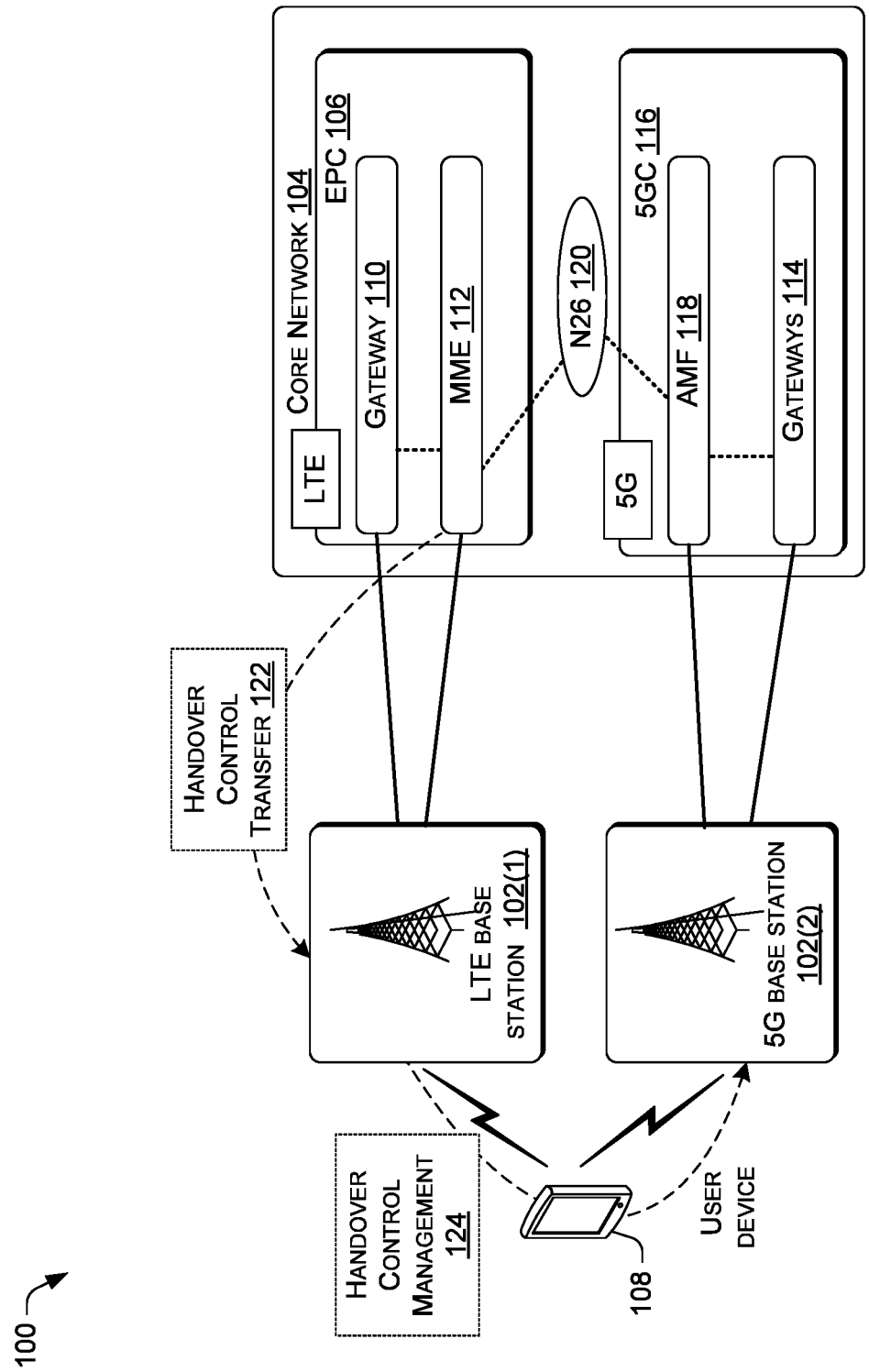
FIG. 1 illustrates an example architecture for implementing the process of the accelerated return of a user device to the 5G system after LTE fall back.

This disclosure is directed to techniques for automatically moving the user device from using an LTE system to a 5G system following an initial fall back to the LTE system. These techniques may be used to move the user device back to the 5G system even when the user device is communicatively connected to the LTE system and has active data bearer traffic that prevents the core network from setting the user device to idle. A data bearer is a pipeline that is established for transporting data among a user device, a base station, gateways, and/or other entities. The techniques may use LTE and 5G base stations that are connected via a wired backhaul to the core network. The core network may include a Access and Mobility Management Function (AMF) that transfers the user device from the 5G system to the LTE system for IMS voice communication. At the end of the IMS voice communication, it may be preferred for the user device to be moved back from the LTE system to the 5G system for a better user experience. Conventionally, at the end of the IMS voice communication, if the user device is not using any active data bearers, the user device is placed by the LTE base station in an idle state. Following entry into the idle state, the user device may disconnect from the LTE system and connect to the 5G system. However, if the user device is using active data bearers at the end of the IMS voice communication, the LTE base station is unable to place the user device in the idle state. For example, the user device may be using active data bearers at the end of the IMS voice communication when the user device is actively engaged in data communication with another computing device via the LTE system. This activity prevents the user device from disconnecting itself from the LTE system and connecting to the 5G system. As a result, the user device may remain communicatively connected to the LTE system for an extended time period.

In various embodiments, an LTE base station that is connected to the user device may be configured to compel the user device to move from the LTE system to the 5G system at the end of the IMS voice communication. The LTE base station may use a programmable timer of a predetermined time duration to perform this function. Upon expiration of the timer, in case the user device is still using active bearers and cannot be moved to an idle state by the core network, the LTE base station can initiate the handover procedure to move the user device back to the 5G system. The user device is synchronized with a 5G base station of the 5G system and handover is confirmed by user device. Further, the 5G base station confirms the user device handover to the 5G network control module Access and Mobility Management Function (AMF). For example, the AMF notifies the MME of the handover via a communication mechanism, such as the N26 interface, and the transfer of the user device back to 5G is completed. However, if the user device does not have any active data bearers at the expiration of the time, the LTE base station may command the user device to enter an idle mode. Following entry into the idle mode, the user device may disconnect from the LTE base station and connect to a 5G base station of the 5G system.

The techniques may lead to quicker transfers of user devices from the LTE system to the 5G system of a wireless telecommunication network for a better user experience. If the network recognizes that the user device is involved in an emergency voice communication, the techniques allow for the user device to remain communicatively connected to the LTE network for better communication in case of an emergency voice call back. In contrast, conventional techniques for handling user device transfers from the LTE system to the 5G system may allow the user device to remain communicatively connected to the LTE system even when it would be beneficial for the user device to be transferred back to the 5G system. The techniques may also improve the network efficiency and provide uniformity in the user experience. The techniques described herein may be implemented in several ways. Example implementations are provided below with reference to the following figures.

Example Network Architecture

FIG. 1 illustrates an example network architecture of a wireless telecommunication network 100 for implementing the process of the accelerated return of a user device to the 5G system after LTE fall back. The wireless telecommunication network 100 may include an LTE base station 102(1), a 5G base station 102(2) and a wireless communication core network 104. The base stations 102(1) and 102(2) are responsible for handling voice and data traffic between user devices and the core network 104 via air interfaces. The LTE base station 102(1) may be responsible for handling voice and data traffic, via an Evolved Packet Core (EPC) 106 framework, over an LTE system of the wireless telecommunication network 100, while the 5G base station 102(2) may be responsible for handling voice and data traffic over a 5G system of the wireless telecommunication network 100. A user device 108 may be a smartphone, a tablet computer, or any other device that can use the wireless communication services that are provided by the wireless communications carrier network. The core network 104 may provide telecommunications and data communication services to the user device 108 in which the user device 108 is both LTE and 5G compatible.

The LTE system of the core network 104 may include LTE domain components that support LTE data traffic and LTE voice traffic. For example, data and IMS voice traffic from the user device 108 to the core network may be routed through one or more gateways 110 of the EPC 106. Additionally, the LTE domain components may include the mobility management entity (MME) 112 of the EPC 106. The MME 112 may handle LTE compatible user device paging, authentication and registration with the EPC 106, as well as routing of data and IMS voice communication through selected gateways of the gateways 110.

The 5G system of the core network 104 may further contain 5G domain components that support 5G data traffic and 5G voice traffic. 5G data and IMS voice communication traffic from the user device 108 to the core network 104 may be routed through one or more 5G gateways 114 of a 5G Core (5GC) 116. 5G domain components may include the access and mobility management function (AMF) 118 of the 5GC 116 and may handle 5G compatible user device 108 registration, authentication and connection management with the 5GC 116. Accordingly, both the MME 112 and the AMF 118 may access subscriber information and provide management of the user device 108, while user device 108 is communicatively connected to the core network 104. The MME 112 and the AMF 118 may be connected and may share user device 108 status information through communication interface N26 120.

The LTE IMS voice communications may have more optimized voice quality in comparison with 5G voice calls, as the LTE system is more mature with more robust network coverage. As a result, even though a user device 108 may be communicatively linked to the core network 104 via the 5G system gateway 114, it may be preferable that the user device be transferred to the LTE system via the LTE gateway 110 for any IMS voice communication sessions. It may be desired that at termination of the IMS voice communication sessions over the LTE system, the user device 108 be transferred to be communicatively linked to the 5G system gateway 114. For example, at a termination of the IMS voice communication session for the user device 108, the LTE base station 102(1) that is communicatively linked to the user device 108 may send a directive to place user device 108 in an idle state in case there are no other active bearers. After the LTE base station has commanded the user device 108 to enter into the idle state, the user device 108 may disconnect from the LTE system and communicatively link back to the 5G system.

However, if the user device 108 is using active data bearers at the termination of the IMS voice communication session, the active data bearers may prevent user device 108 from being placed in the idle state. In such an instance, the LTE base station 102(1) may facilitate the transfer back of the user device 108 from the LTE system to the 5G system. In at least one embodiment, the LTE base station may initiate a handover control management 124 that handover the user device 108 from LTE system to the 5G base station 102(2). In turn, the core network 104 may use handover control transfer 122 to transfer the user device 108 from the LTE system to the 5G system. For example, at the commencement of the user device 108 transfer process, the LTE base station 102(1) may commence a timer for a set time period. At the expiration of the set time period, the LTE base station 102(1) may determine whether the user device 108 is using one or more active data bearers. Thus, if the user device 108 is using one or more active data bearers, the LTE base station 102(1) may initiate a handover procedure to direct the user device 108 to disconnect from the LTE base station 102(1) and communicatively connect to the 5G base station 102(2). In response, the user device 108 may confirm successful connection to 5G, and in turn, the 5G base station 102(2) may convey completion of handover to control module AMF (118). Accordingly, the control module AMF 118 may send notice of relocation of user device 108 to the MME 112, thereby completing the handover of user device 108 from the LTE system back to the 5G system. However, if the LTE base station 102(1) determines that the user device 108 is not using any active data bearers at the expiration of the time period, the LTE base station 102(1) may command the user device 108 to enter an idle mode. Following entry into the idle mode, the user device 108 may disconnect from the LTE base station 102(1) and connect to the 5G base station 102(2).

Example LTE Base Station Components

Figure 2:
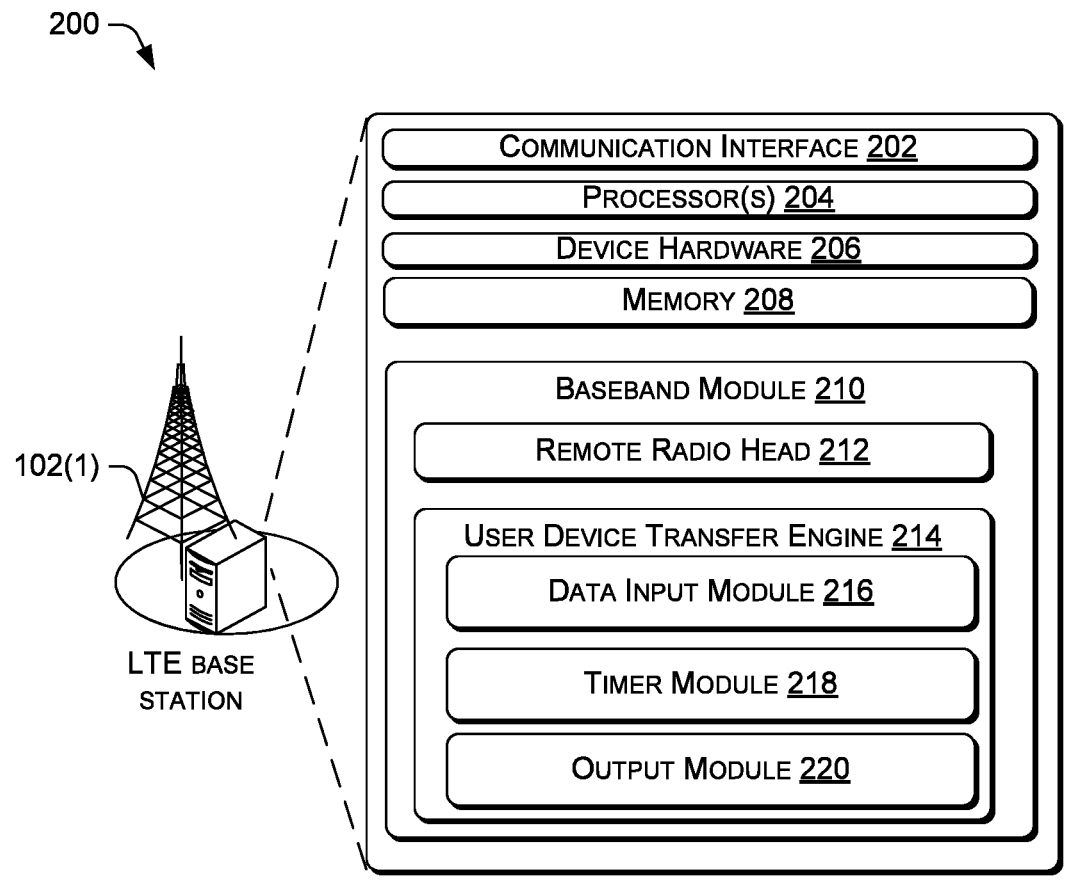
FIG. 2 is a block diagram showing various components of an LTE base station that implements the accelerated return of a user device to the 5G system after LTE fall back.

FIG. 2. is a block diagram showing various components of an LTE base station that implement the accelerated return of a user device to the 5G system after LTE fall back. The one or more computing devices of the LTE base station 102(1) may include a communications interface 202, one or more processors 204, one or more hardware devices 206, memory 208, and baseband module 210. The communications interface 202 may include wireless and/or wired communication components that enable the computing devices to transmit data and receive data from other network devices. The hardware 206 may include additional hardware interfaces, data communications, or data storage hardware. For example, the hardware interfaces may include a data output device and one or more input devices. The data input devices may include, but are not limited to, combinations of one or more of the following: keypads, mouse devices, touch screens that accept gestures, microphones, voices or speech recognition devices, and any other suitable devices. The memory 208 may be implemented using computer-readable media, such as computer storage media. Computer readable media includes at least two types of computer readable media, namely computer storage media and communications media. Computer storage media includes volatile and nonvolatile, removable and nonremovable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD), high definition multimedia/data storage disks, or other optical storage, magnetic cassettes, magnetic tape, magnetic disk storage or other magnetic storage devices, or any other non-transmission medium that can be used to store information for access by a computing device. In contrast, communications media may embody computer readable instructions, data structures, program modules, or other data in a modulated data signal, such as carrier wave, or other transmission mechanism.

As a part of the baseband module 210, the remote radio head (RRH) 212 may be linked to the hardware 206 by an optical-fiber connection carrying downlink and uplink digital radio signals along with operations, administration and maintenance information. The RRH may be communicatively linked with the user device via radio signals via multiple RF paths. In various embodiments, the RRH 212 may be located on an existing radio tower, building rooftop, or along with LTE equipment. The baseband module 210 may provide user device 108 voice and data communication processing and control over the communication of the user device 108 and the core network 104.

The communications interface 202, processors 204, the memory 208 and the baseband module 210 may implement a user device network transfer engine 214. The user device network transfer engine 214 may include a data input module 216, a timer module 218 and an output module 220. The data input module 216 may receive data from the baseband module 210. The data may include an indicator from the user device that the voice communication has ended, information on whether the voice communication is a non-emergency voice communication or an emergency communication, and information on whether the user device has active data bearers after the completion of the voice communication. The information may include various values, flags, and/or codes that represent different conditions.

Accordingly, the timer module 218 may use this data to commence a timer for a set period of time within which the user device remains communicatively linked to LTE. In various embodiments, the set period of time may depend on whether the IMS voice communication is a non-emergency communication or an emergency communication. In various embodiments, the length of the set period of time may be established by other qualities of the voice or data communication.

The output module 220 may generate configuration files for the implementation of the user device transfer from the LTE system to the 5G system. The output module 220 may generate the configuration files when the data received by the data input module 216 indicates that the user device is using active data bearers at the expiration of the set period of time. The configuration files may include addressing and configuration data for the user device that are used by the LTE base station 102(1) to direct the user device 108 to disconnect from an LTE base station 102(1) and communicatively connect to the 5G base station 102(2). In one instance, the configuration file may be used by the LTE base station 102(1) to initiate a handover procedure for the user device according to 3GPP 23.502, Section 4.11.1.2.2. In some embodiments, the output module 220 may generate additional configuration files and scripts that provide the user device addressing information to the core network 104.

However, if the data received by the data input module 216 indicates that the user device is not using active data bearers at the expiration of the set period of time, the LTE base station 102(1) may command the user device 108 to enter an idle mode. Following entry into the idle mode, the user device 108 may disconnect from the LTE base station 102(1) and connect to the 5G base station 102(2).

Example MME Components

Figure 3:
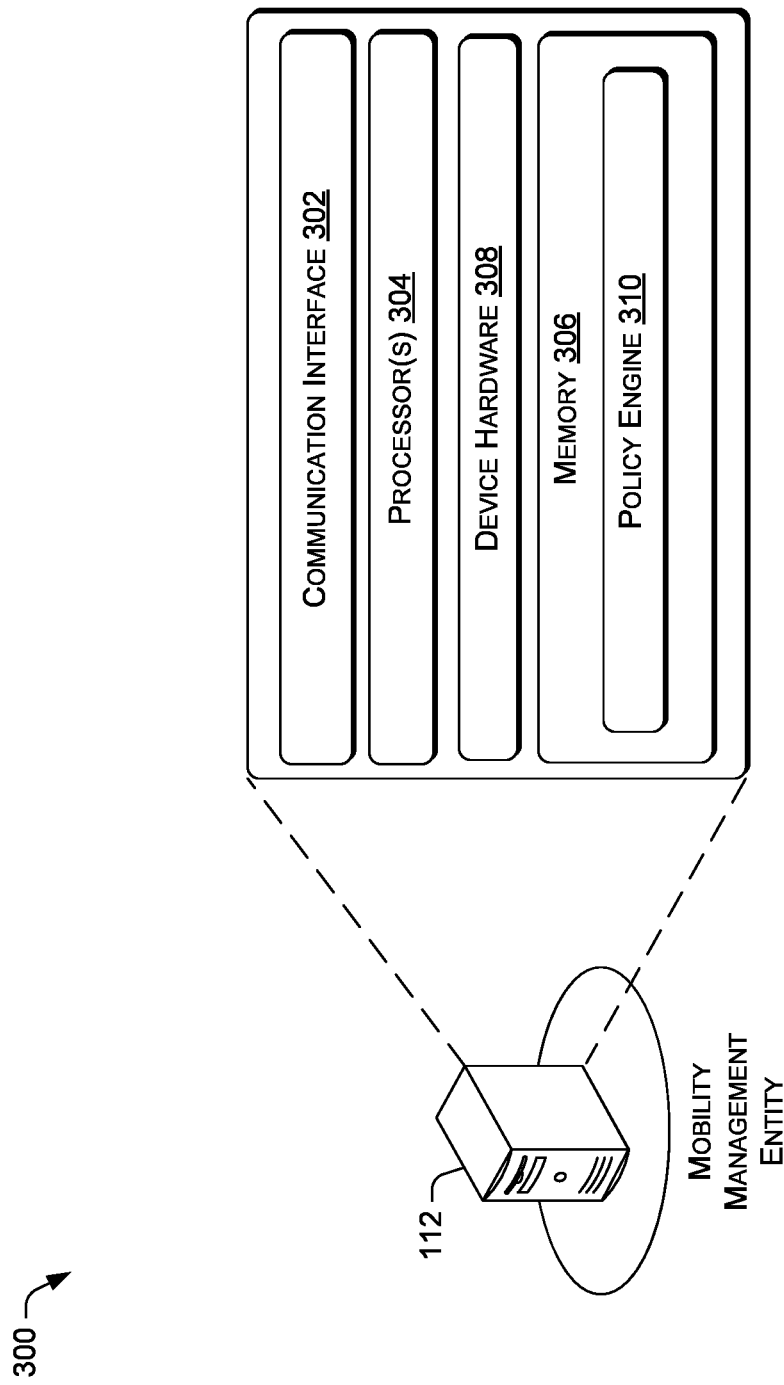
FIG. 3 is a block diagram showing various components of one or more illustrative devices in the core network that implement the accelerated return of a user device to the 5G system after LTE fall back.

FIG. 3. is a block diagram showing various components of an MME that implement the accelerated return of a user device 108 to the 5G system after LTE fall back. The one or more computing devices of the MME may include a communications interface 302, one or more processors 304, device hardware 306, memory 308, and policy engine 310. The communications interface 302 may include wired communication components that enable the computing devices to transmit data and receive data from other network devices. The hardware 306 may include additional hardware interfaces, data communications, and data storage hardware. For example, the hardware interfaces may include a data output device and one or more input devices. The data input devices may include, but are not limited to, combinations of one or more of keypads, mouse devices, touch screens that accept gestures, microphones, voices or speech recognition devices, and any other suitable devices. The memory 308 may be implemented using computer-readable media, such as computer storage media. Computer readable media includes at least two types of computer readable media, namely computer storage media and communications media. Computer storage media includes volatile and nonvolatile, removable and nonremovable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD), high definition multimedia/data storage disks, or other optical storage, magnetic cassettes, magnetic tape, magnetic disk storage or other magnetic storage devices, or any other non-transmission medium that can be used to store information for access by a computing device. In contrast, communications media may embody computer readable instructions, data structures, program modules, or other data in a modulated data signal, such as carrier wave, or other transmission mechanism.

In various embodiments, the communication interface 302, the processors 304, and the memory 308 of the MME may execute the policy engine 310. For example, the communications interface 302 may be used to control functions of the policy engine 310 and share addressing information of the user device 108 with the AMF and the 5G system control module. Accordingly, both the MME and AMF may access a user device, addressing and tagging information to perform their function. The policy engine 310 may assume a control function for the user device, tagging and tracking the user device while it is communicatively connected to the core network, through the LTE system. For example, when a user device is moving from idle state to establishing a voice communication with the core network through LTE, the policy engine 310 of the MME may address and tag the user device and direct the user device to a gateway for connection with components of the core network. The policy engine 310 may be involved in the data bearer activation and deactivation process, which may control the ability of the core network to set a user device to the idle state after the completion of a communications session. For example, at the end of an LTE voice communication session, the MME may issue a voice bearer release to the LTE base station. In turn, the LTE base station may either direct the user device to enter an idle state or direct the user device to disconnect from the LTE and communicatively connect to the 5G system by handover procedures defined by 3GPP 23.502, Section 4.11.1.2.2.

Example Processes

Figure 4:
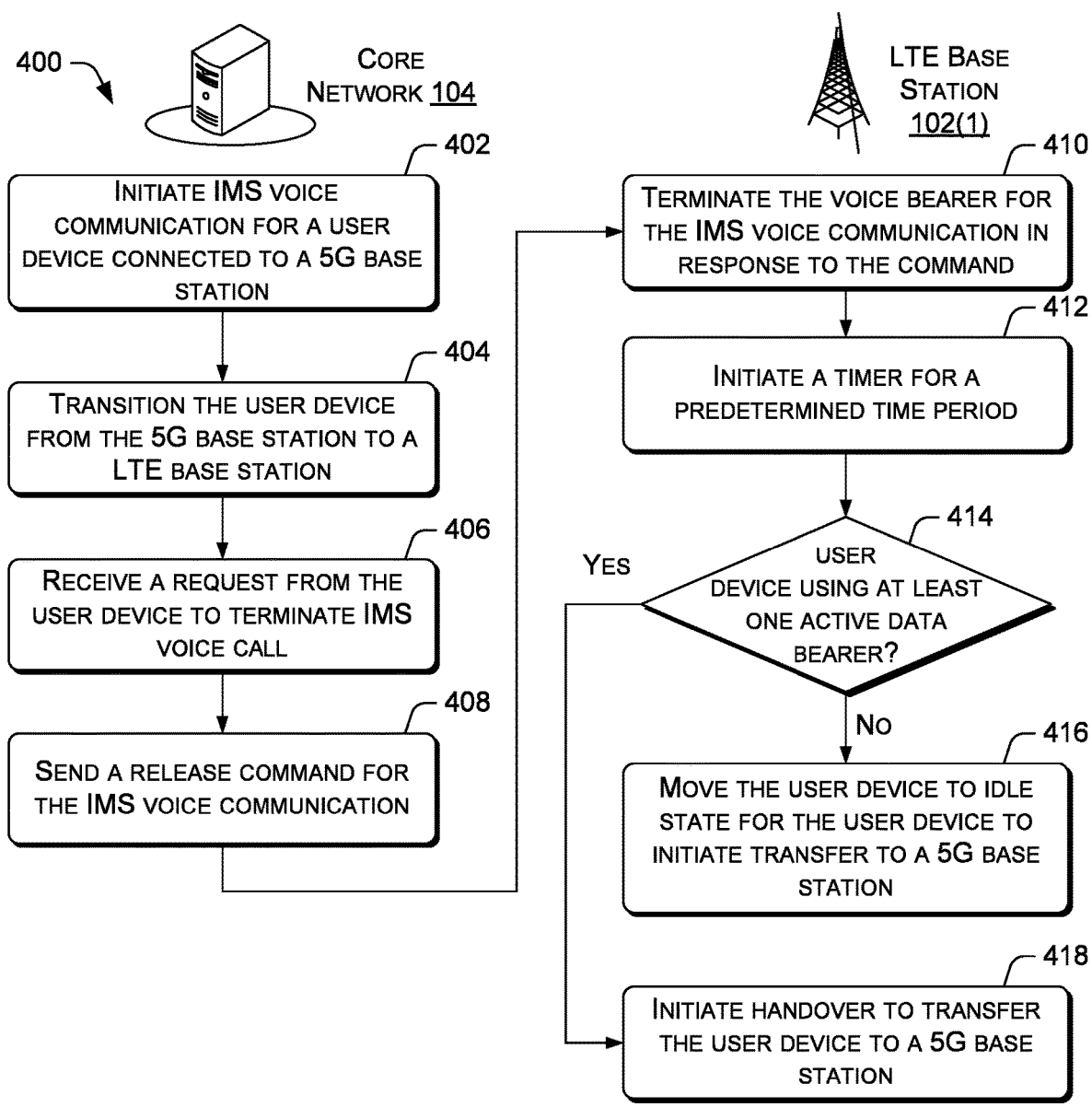
FIG. 4 is a flow diagram of an example process for the accelerated return of a user device to the 5G system after LTE fall back.
Figure 5:
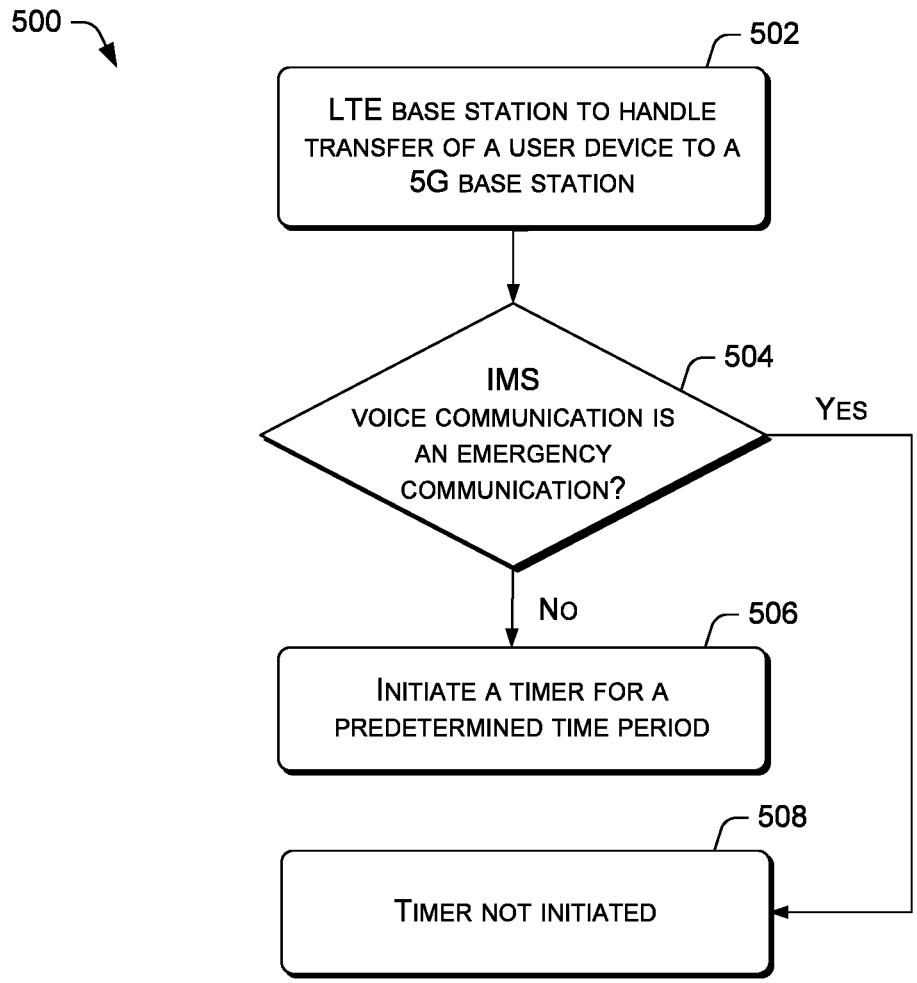
FIG. 5 is a flow diagram of an example process for determining whether to initiate a timer for the accelerated return of a user device to the 5G system after LTE fall back.

FIGS. 4 and 5 present illustrative processes 400-500 for implementing the accelerated return of a user device to the 5G system after LTE fall back. Each of the processes 400-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement abstract data types. The order in which the operations are described is not intended to be construed as a limitation, and any number of the described blocks can be combined in any order and/or in parallel to implement the process. For discussion purposes, the processes 400-500 are described with reference to the wireless telecommunication network 100 of FIG. 1.

FIG. 4 is a flow diagram of an example process 400 for transferring a user device from 5G to the LTE system for a voice communication session and subsequently transferring the user device back to 5G at the end of the IMS voice communication session. At block 402, the AMF of a core network may determine that an IMS voice communication is being initiated for a user device that is communicatively connected to a 5G base station. In some embodiments, the IMS voice communication session is initiated by the user device. In other embodiments, the IMS voice communication session may be initiated by the user device in response to an incoming voice call from a caller user device that is directed to the user device. At block 404, the AMF may transition the user device from the 5G base station to the LTE base station. For example, the MME may receive user device addressing records from the AMF and select a gateway to complete the IMS voice communication connection. The commencement of the IMS communication session is completed by the user device connection with the core network via the EPC framework of the LTE.

At block 406, the MME may receive an indication from the gateway that the user device has ended the IMS voice communication session. Alternatively, the MME may receive an indication from the gateway that the IMS voice communication session has ended from a caller user device that is connected to the user device via the IMS voice communication session. At block 408, the MME may send a release command to the LTE base station indicating that a voice bearer assigned to carrying the IMS voice communication traffic for the user device is to be released.

At block 410, the LTE base station may receive the release command and terminate the voice bearer for the IMS voice communication session in response to the release command. At block 412, the LTE base station may initiate a timer for a set time period. The timer may allow for the one or more active data bearers used by the user device, to terminate. At decision block 414, the LTE base station may determine whether the user device is using at least one active data bearer at the end of the time period. If there are no active data bearers, the process 400 proceeds to block 416. Alternatively, if the user device is actively using at least one data bearer, the process 400 may proceed to block 418.

At block 416, at a determination that the user device is not using active any data bearers, the LTE base station may place the user device in an idle state. Subsequently, the user device may communicatively disconnect from the LTE base station and communicatively connect to a 5G base station.

At block 418, at a determination that the user device is actively using at least one data bearer, the LTE base station may commence a procedure to transfer the user device to the 5G base station. For example, the LTE base station may direct the user device to communicatively disconnect itself from the LTE base station and reconnect itself to the 5G base station, based on the prior IMS voice communication session addressing information stored by the user device. In some embodiments, the user device may select the 5G base station that it communicatively connects to after a query and determination of the 5G base station with the highest communication channel quality.

FIG. 5 is a flow diagram of an example process 500 for determining whether to initiate a timer for the accelerated return of a user device to the 5G system after LTE fall back. At block 502, the LTE base station may be initiated by the MME to handle the transfer of the user device to a 5G base station. The LTE base station has information pertinent to user device, which may include, but not be limited to, user device prior and current addressing data, the voice communication session condition, user device authentication services, security data, and one or more conditions for the voice communication. For example, the voice communication session condition may be a determination of whether the voice communication session is as an emergency or non-emergency voice communication.

At decision block 504, the LTE base station may determine whether IMS voice communication is an emergency communication. For example, the IMS voice communication may be defined as a non-emergency voice communication or an emergency voice communication. If the IMS voice communication is defined as a non-emergency communication, the process 500 proceeds to block 506. Alternatively, if the communication qualifies as an emergency communication, the process 500 proceeds to block 508.

At block 506, if the IMS voice communication is a non-emergency voice communication, a timer is initiated for a predetermined length of time. Alternatively, at block 508, if the IMS voice communication is an emergency voice communication, no timer is initiated, and the user device remains connected to the LTE base station.

CONCLUSION

Although the subject matter has been described in language specific to the structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of an LTE base station of a wireless carrier network storing computer-executable instructions that upon execution cause one or more processors to perform acts comprising:

receiving, at the LTE base station, a release command for a voice bearer carrying an IMS voice communication of a user device, the release command being provided by a core network of the wireless carrier network following a termination of the IMS voice communication, the IMS voice communication being terminated without the user device being placed into an idle state by the LTE base station;
based on characteristics of communications between the LTE base station and the user device, determining a time period for the user device to remain communicatively coupled to the LTE base station;
initiating a timer for the time period following a release of the voice bearer in response to the voice bearer release command;
in response to at least the LTE base station carrying an active data bearer for data traffic of the user device at an end of the time period, directing the user device to switch from being communicatively coupled to the LTE base station to being communicatively coupled to a 5G base station of the wireless carrier network; and
in response to the LTE base station not carrying any active data bearers for data traffic of the user device at the end of the time period, placing the user device into an idle state.

2. The one or more non-transitory computer-readable media of claim 1, wherein the user device being placed in the idle state prompts the user device to transition from being communicatively coupled to the LTE base station to being communicatively coupled to the 5G base station.

3. The one or more non-transitory computer-readable media of claim 1, wherein the initiating includes commencing the timer when the IMS voice communication is a non-emergency IMS voice communication.

4. The one or more non-transitory computer-readable media of claim 1, wherein the voice bearer is a QC1 bearer configured to carry IMS voice packets.

5. The one or more non-transitory computer-readable media of claim 1, wherein the directing includes directing the user device to switch in response to the active data bearer carrying data traffic for the user device at the end of the time period and a determination that the user device is a 5G-capable device.

6. The one or more non-transitory computer-readable media of claim 1, wherein the directing includes directing the user device to switch in response to a detection of the active data bearer carrying data traffic for the user device at the end of the time period and a determination that the IMS voice communication is a non-emergency communication.

7. The one or more non-transitory computer-readable media of claim 1, wherein the directing includes directing the user device to switch according to a 3GPP handover procedure.

8. The one or more non-transitory computer-readable media of claim 1, wherein determining the time period for the user device to remain communicatively coupled to the LTE base station is based on whether the IMS voice communication is a non-emergency communication or an emergency communication.

9. A system, comprising:
one or more processors; and
memory having instructions stored therein, the instructions, when executed by the one or more processors, cause the one or more processors to perform acts comprising:
receiving, at an LTE base station, a release command for a voice bearer carrying an IMS voice communication of a user device, the release command being provided by a core network of a wireless carrier network following a termination of the IMS voice communication, the LTE voice communication being terminated without the user device being placed into an idle state by the LTE base station;
based on characteristics of communications between the LTE base station and the user device, determining a time period for the user device to remain communicatively coupled to the LTE base station;
initiating a timer for the time period following a release of the voice bearer in response to the voce bearer release command;
in response to at least the LTE base station carrying an active data bearer for data traffic of the user device at an end of the time period, directing the user device to switch from being communicatively coupled to the LTE base station to being communicatively coupled to a 5G base station of the wireless carrier network; and
in response to the LTE base station not carrying any active data bearers for data traffic of the user device at the end of the time period, placing the user device into an idle state.

10. The system of claim 9, wherein the initiating includes commencing the timer when the IMS voice communication is a non-emergency IMS voice communication or not initiating the timer.

11. The system of claim 9, wherein the user device being placed in the idle state prompts the user device to transition from being communicatively coupled to the LTE base station to being communicatively coupled to the 5G base station.

12. The system of claim 9, wherein the voice bearer is a QC1 bearer configured to carry IMS voice packets.

13. The system of claim 9, wherein the directing includes directing the user device to switch in response to the active data bearer carrying data traffic for the user device at the end of the time period and a determination that the user device is a 5G-capable device.

14. The system of claim 9, wherein the directing includes directing the user device to switch in response to a detection of the active data bearer carrying data traffic for the user device at the end of the time period and a determination that the IMS voice communication is a non-emergency communication.

15. The system of claim 9, wherein the directing includes directing the user device to switch according to a 3GPP handover procedure.

16. A computer implemented method, comprising:
receiving, at an LTE base station, a release command for a voice bearer carrying an IMS voice communication of a user device, the release command being provided by a core network of a wireless carrier network following a termination of the IMS voice communication, the LTE voice communication being terminated without the user device being placed into an idle state;
based on characteristics of communications between the LTE base station and the user device, determining a time period for the user device to remain communicatively coupled to the LTE base station;
initiating a timer for the time period following a release of the voice bearer in response to the release command;
in response to at least the LTE base station carrying an active data bearer for data traffic of the user device at an end of the time period, directing the user device to switch from being communicatively coupled to the LTE base station to being communicatively coupled to a 5G base station of the wireless carrier network; and in response to the LTE base station not carrying any active data bearers for data traffic of the user device at the end of the time period, placing the user device into an idle state.

17. The computer implemented method of claim 16, wherein the user device being placed in the idle state prompts the user device to transition from being communicatively coupled to the LTE base station to being communicatively coupled to the 5G base station.

18. The computer implemented method of claim 16, wherein the initiating includes commencing the timer when the IMS voice communication is an IMS non-emergency voice communication.

19. The computer implemented method of claim 16, wherein the voice bearer is a QC1 bearer configured to carry IMS voice packets.

20. The computer implemented method of claim 16, wherein the directing includes directing the user device to switch in response to the active data bearer carrying data traffic for the user device at the end of the time period and a determination that the user device is a 5G-capable device.

\* \* \* \* \*